Figures 1, 2, 3:
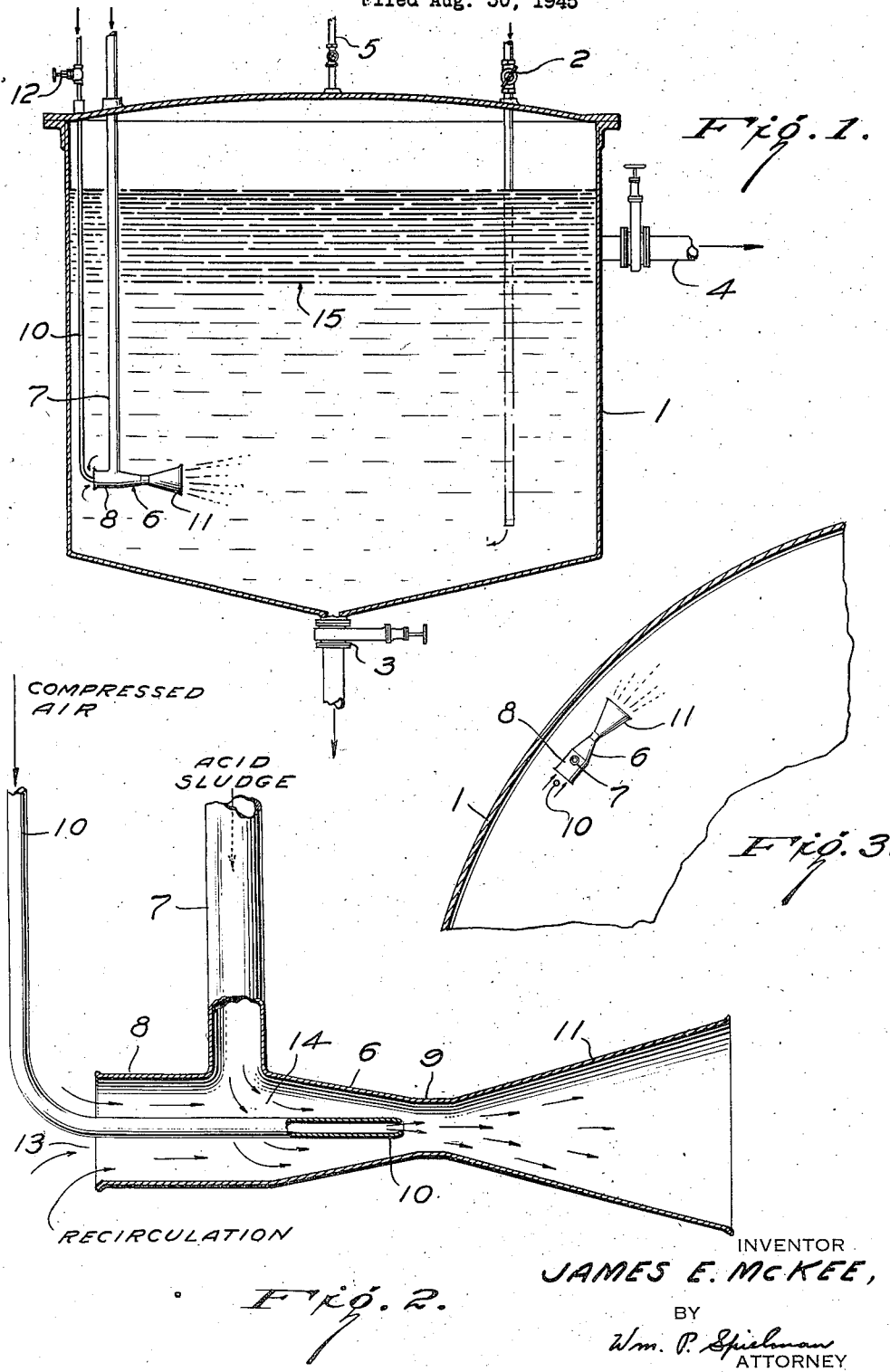

Feb. 11, 1947.　　　　J. E. McKEE　　　　2,415,650
METHOD AND APPARATUS FOR HYDROLYZING ACID SLUDGES
Filed Aug. 30, 1945

INVENTOR
JAMES E. McKEE,
BY
Wm. P. Spielman
ATTORNEY

Patented Feb. 11, 1947

2,415,650

UNITED STATES PATENT OFFICE 2,415,650

METHOD AND APPARATUS FOR HYDROLYZING ACID SLUDGES

James E. McKee, Wilmington, Del., assignor to Chemical Construction Corporation, New York, N. Y., a corporation of Delaware Application August 30, 1945, Serial No. 613,659

4 Claims. (Cl. 23—271)

This invention relates to the hydrolization of acid sludges such as refinery sludge, which is a viscous material obtained in the purification of petroleum hydrocarbons by admixture with strong sulfuric acid or oleum. The sludge contains most of the sulfuric acid used in the oil treatment, either as free acid or combined with unsaturated portions of the oil in the form of sulfuric acid condensation products of undetermined composition.

For many years it has been the practice to hydrolyze refinery sludges to break down the hydrocarbon-sulfuric acid condensation products and separate the sulfuric acid for recovery and re-use. The customary methods of hydrolysis have consisted either in mixing the water and sludge together as they flow into a tank or in pouring a stream of sludge into a body of water. In either case, however, much heat is generated when fresh water is mixed with the sludge. This frequently results in excessive foam and in reductive decomposition of the acid sludge with evolution of sulfur dioxide which creates a considerable fume nuisance. Moreover, part of the sludge is sometimes carbonized, and the resulting coke becomes emulsified in the water-oil mixture and intensifies the problem of separation.

It is a principal object of the present invention to provide a method for the hydrolysis of acid sludges such as refinery sludge, spent alkylation acid and the like, in which localized heating due to the mixing of sludge with water is avoided. A still further object is the provision of a process in which the sludge is hydrolized by admixture with dilute sulfuric acid, instead of with fresh water. A still further and even more important object is the provision of a method for the combined agitation and hydrolysis of acid sludge by introducing the sludge into a recirculating stream of diluted sludge acid. The provision of suitable apparatus for accomplishing the above purposes constitutes another important object of the invention.

For the accomplishment of these and other objects which will become apparent from the following description of preferred embodiments of the invention, when taken with the annexed drawing, the invention consists in the process steps and in the combination of apparatus features hereinafter described and pointed out in the appended claims.

I have found that acid sludges of various types can be hydrolyzed completely and rapidly by feeding the sludge below the surface of a body of dilute sulfuric acid while the latter is passing through a restricted orifice submerged to provide the requisite degree of agitation for thorough mixing. I have also found that a very intimate mixture of the dilute acid and acid sludge is obtained when a jet of air or other compressed gas is passed through this orifice. Not only does such an air jet promote a more intimate mixing of the sludge and dilute acid, but it also functions as an impelling or propulsive means to create and maintain a recirculating flow of the acid through the mixing device. The resulting sludge-acid mixture is preferably ejected from the restricted orifice into a relatively large body of dilute sulfuric acid, such as acid which has already been separated from the acid sludge by hydrolysis, whereby hydrolysis of the sludge takes place throughout the body of acid and local overheating is avoided. The separated oil then rises to form an upper oil layer in the separation tank while the sulfuric acid remains in the aqueous liquid to fortify the strength thereof.

The invention will be described in greater detail by reference to the accompanying drawing, wherein apparatus suitable for accomplishing the object thereof is diagrammatically shown. In the drawing Fig. 1 is a tank for the hydrolysis of acid sludge equipped with a jet mixer submerged in the aqueous layer of acid. Fig. 2 is in enlarged detail showing the construction of a preferred form of the jet mixer, and Fig. 3 is a modification wherein the mixer is located tangentially in the separating tank.

Referring to Fig. 1 a tank indicated generally by reference numeral 1 is provided with a valved inlet 2 for water or relatively weak sulfuric acid and with valved outlets 3 and 4 for sludge acid and separated hydrocarbons, respectively, and a valved air outlet 5 in the cover thereof. In accordance with the present invention, this tank is provided at a point well below the acid level with a mixing device 6 to which the sludge to be hydrolyzed is introduced through a pipe 7. The mixing device 6 is preferably of the type shown in detail in Fig. 2 of the drawing, consisting generally of a tubular mixing chamber 8 having an open end 13 for admitting a recirculating flow of the dilute sulfuric acid and a restricted throat 9 adjacent its opposite end for promoting the turbulent admixture of said acid with sludge entering through the pipe 7. An air inlet pipe 10 having an open end adjacent the throat or restricted orifice 9 is preferably provided in the chamber 8 for the introduction of compressed air or other suitable gas. The throat 9 preferably terminates in a flared outlet 11 on the outlet side thereof in order to induce a venturi action and permit the compressed air entering through the pipe 10 to serve as an impelling means for creating and maintaining a recirculating flow of acid and sludge in the tank 1.

In some cases, as when hydrolyzing heavy sludges of the type obtained from the sulfuric acid treatment of lubricating oil stocks, it is preferable to arrange the mixing device 6 tangentially to the side wall of a cylindrical tank, as is shown in Fig. 3 of the drawing. This tangential arrangement causes a circulation of the acid circumferentially of the tank and promotes separation of the oil therefrom and stratification of the oil and water layers.

In carrying out the process of my invention, water or dilute sulfuric acid is preferably admitted to the tank 1 through the valved acid inlet 2 until the mixing device 6 is submerged therein, a suitable acid level being illustrated by reference numeral 15. Compressed air is then blown through the throat 9 of the mixing device 6 by opening the valve 12 in the air inlet pipe 10. Acid is drawn in through the inlet 13 formed by the open end of the pipe 8 and is ejected through the restricted throat 9 and flared outlet 11, and thereby a recirculating flow of acid through the mixing device 6 is initiated. Acid sludge is then admitted through the pipe 7 and introduced into the mixing space 14 formed at the junction of the pipe 7 with the chamber 8. The sludge so introduced is drawn along with the recirculating flow of acid and intimately mixed therewith by the action of the compressed air as it passes through the throat 9 so that an intimate mixture of sludge and acid is discharged through the outlet 11. Since the hydrolyzing agent is aqueous sulfuric acid rather than fresh water the hydrolysis takes place at a relatively slow rate, and therefore the sludge is mixed uniformly with the main body of acid in the tank before the reaction is completed. The rate of hydrolysis can easily be regulated by adjusting the strength of the sulfuric acid, which in practice may vary anywhere from 25-35% sulfuric acid content up to as much as 50-60%. With some refinery sludges an acid strength of about 30-35% is preferred, whereas with spent alkylation sulfuric acid the preferred strength is about 50-60%. A second control feature is the rate of recirculation through the pipe 8 and throat 9, which rate is controlled by the amount of compressed air introduced through the pipe 10.

Upon hydrolysis of the organic sulfates or sulfonates and other hydrocarbon-sulfuric acid condensation products in the sludge the sulfuric acid derived therefrom is dissolved in the aqueous liquid in the tank 1, while the oily portion of the sludge rises and forms a surface layer in the tank 1. The oil may be continuously or intermittently withdrawn through the valve pipe 4, while simultaneously removing acid through the valve outlet pipe 3. The process of the present invention is therefore well suited for continuous operation.

What I claim is:

1. A method of hydrolyzing acid sludges which comprises maintaining a body of dilute sulfuric acid, recirculating a flow of said acid through a mixing chamber submerged below the surface thereof, and introducing acid sludge into said mixing chamber and ejecting the resulting mixture below the surface of the acid, whereby hydrolysis of the sludge takes place throughout the body of acid and local overheating is avoided.

2. A method of hydrolyzing acid sludges which comprises maintaining a body of dilute sulfuric acid, introducing a jet of compressed air into a mixing chamber submerged below the surface thereof and thereby maintaining a recirculating flow of said acid through said chamber, introducing acid sludge into said mixing chamber and mixing it intimately with the recirculating acid by the turbulence created by the air jet, and ejecting the resulting mixture below the surface of the acid whereby hydrolysis of the sludge takes place throughout the body of acid and local overheating is avoided.

3. A method of hydrolyzing refinery sludges which comprises maintaining a body of sulfuric acid of about 25-50% sulfuric acid content, introducing a jet of compressed air into a mixing chamber submerged therein and thereby maintaining a recirculating flow of said acid through said chamber, introducing refinery sludge into said mixing chamber and mixing it intimately with the recirculating acid by the turbulence created by the air jet, and ejecting the resulting mixture below the surface of the acid whereby hydrolysis of the sludge takes place throughout the body of acid and local overheating is avoided.

4. A method of hydrolyzing acid sludges which comprises maintaining a body of dilute sulfuric acid within a vertically cylindrical vessel, introducing a jet of compressed air into a horizontal mixing chamber submerged in said acid adjacent the side wall of said vessel with its longitudinal axis normal to the radius thereof and thereby maintaining a recirculating flow of said acid through said chamber and along the wall of the vessel, introducing acid sludge into said mixing chamber and mixing it intimately with the recirculating acid by the turbulence created by the air jet, and ejecting the resulting mixture below the surface of the acid whereby hydrolysis of the sludge takes place throughout the body of acid and local overheating is avoided.

JAMES E. McKEE.

REFERENCES CITED

The following references are of record in the file of this patent:

UNITED STATES PATENTS

| Number | Name | Date |
| --- | --- | --- |
| 1,325,711 | Chaplin | Dec. 23, 1919 |
| 1,960,013 | Jacobsen | May 22, 1934 |
| 1,625,195 | Dickey | Apr. 19, 1927 |
| 1,098,811 | Loebel et al. | June 2, 1914 |
| 877,248 | Sperry | Jan. 21, 1908 |